J. W. MORRISON.
PROCESS OF PURIFYING WATER.
APPLICATION FILED MAR. 30, 1909.
938,779.
Patented Nov. 2, 1909.
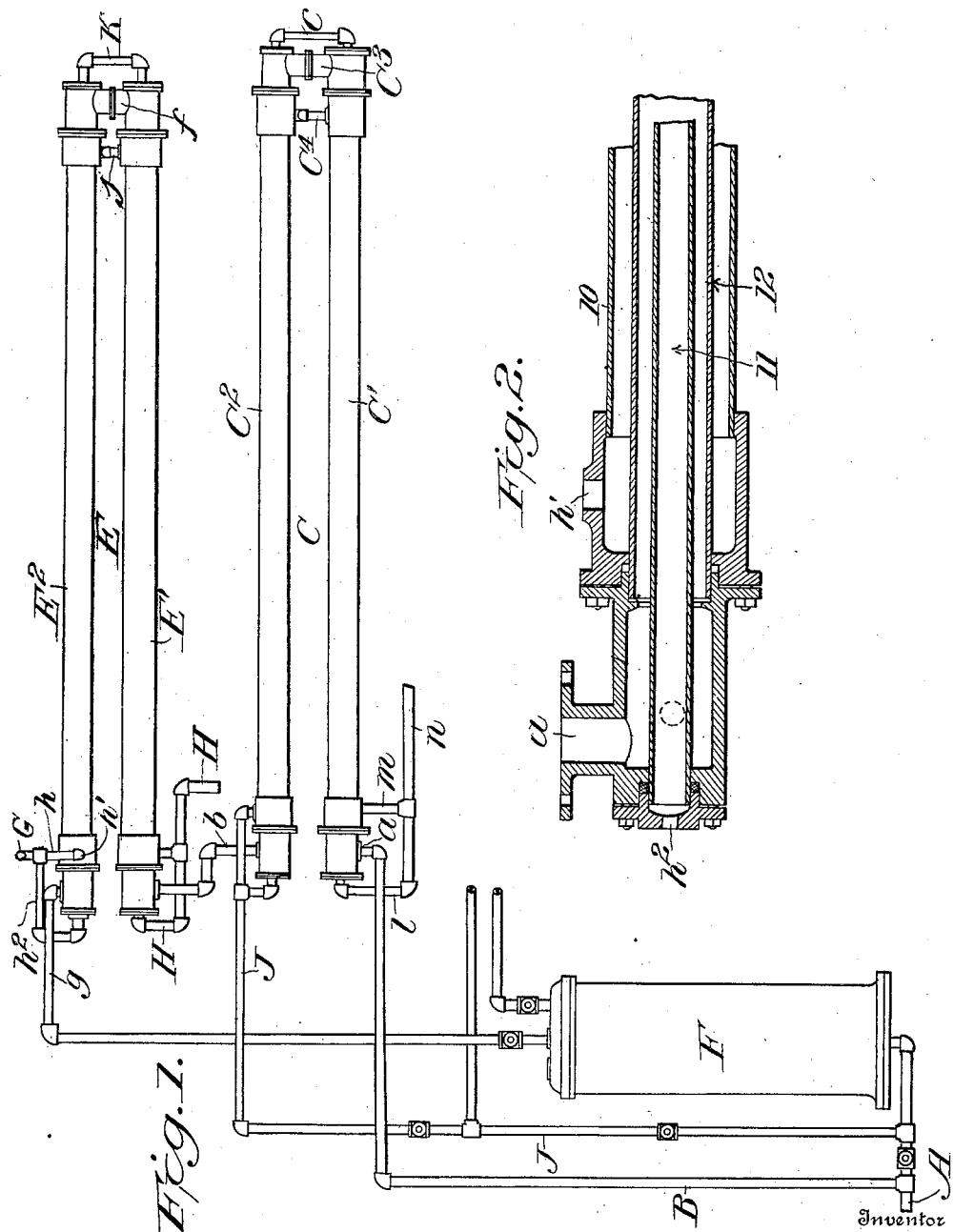

UNITED STATES PATENT OFFICE.

JAMES W. MORRISON, OF BATAVIA, NEW YORK, ASSIGNOR TO STEAM APPLIANCE MANUFACTURING COMPANY, OF BATAVIA, NEW YORK, A CORPORATION OF NEW YORK.

PROCESS OF PURIFYING WATER.

938,779.  Specification of Letters Patent.  Patented Nov. 2, 1909.

Application filed March 30, 1909. Serial No. 486,699.

*To all whom it may concern:*

Be it known that I, JAMES W. MORRISON, a citizen of the United States, residing at Batavia, in the county of Genesee and State of New York, have invented certain new and useful Improvements in Processes of Purifying Water, of which the following is a specification.

My invention relates to a new and useful process of purifying water, by the employment of heat, with or without re-agents, and in so conserving the heat required for the purpose that heat units carried by water purified by the process are utilized to preheat unfiltered water and to thus prepare the same for subsequent superheating to relieve it of the contained impurities, the said filtered water being itself cooled and placed in a potable condition by the elimination of its heat units by the said unfiltered water.

My invention consists of the steps and succession of steps constituting the water-purifying process which I will hereinafter describe and claim.

In the accompanying drawing forming part of this specification, I have illustrated one type of apparatus which will be found useful in carrying out my process, but I wish it understood that the working of the process is not dependent on this or any particular apparatus and that the invention is, accordingly, not limited to the particular means hereinafter described, but that it comprehends and includes any and all means by which the operations hereinafter specified may be followed.

In said drawings:—Figure 1 represents a system of precipitating and cooling coils, with complementary steam and water circulating connections, and a filter arranged in the water-circulation and adapted to operate upon the water which has had its impurities first released by the action of heat, whereby said impurities are removed by filtration. Fig. 2 is an enlarged sectional view of a portion of one of the units of either the precipitating or cooling coil.

It has been demonstrated time and again that where high temperatures are employed in connection with water, the tendency is to precipitate some of the salts held in solution, as also some of the suspended matter, which must be periodically removed. Also, it has been found that, by the aid of steam having a temperature of not less than 320° F., it is possible to impart enough of this heat to water circulating in contact with the steam conductor, to raise the temperature of the water to about 320° F., at about which latter temperature the salts held in solution in the water, such as lime and magnesia, become insoluble and readily precipitate; the water is then conducted through a suitable filter which filters out or removes the precipitated solids, thereby leaving the water free from such for all purposes requiring soft water. With this preliminary reference to the application of a high degree of heat to water for rendering insoluble and capable of precipitation the salts and other impurities contained in water, I will now describe my process in connection with the apparatus herein shown for illustrative purposes.

The pipe A, may lead from a pump or other place and it is the inlet pipe for the water under whatever pressure desired to be purified. This pipe is suitably coupled to a pipe B, which leads into the head end of one of the units of a coil C. In the drawing, I show this coil as composed of two units with suitable end connections, but it will be understood that the coil may consist of any desired number of units, this depending on the volume of water it is desired to treat or soften.

In Fig. 2, I illustrate an enlarged sectional view of a portion of one of the coil units; as the units may be alike, the construction shown in Fig. 2 will answer for each of the units of the aforesaid coil C, as also for the corresponding units of the heating coil E, which I will hereinafter refer to. By reference to Fig. 2 it will be seen that each coil unit comprises an outer casing 10, of tubular form, an inner tube 11, and an intermediate tube 12, the said tubes being concentric with each other, with the intermediate tube spaced from the inner and outer tubes. The three tubes thus form fluid circulating passages in each coil unit, the inner tube of one unit C', connecting at one end with the corresponding tube of another unit C², by means of a pipe C, and the intermediate tube of one unit connecting with the corresponding tube of the other unit C², by means of a tubular connection C³; the outer tube of one unit connects with the corresponding tube of the said other unit C², by means of a pipe C⁴.

As before stated, the water to be purified is conducted by the pipe B, which pipe connects at a (Figs. 1 and 2) with the intermediate tube 12, and the water circulates through this tube and through the end connection C³, and the corresponding intermediate tube of the other coil unit C², and finally leaves the coil through the pipe b, (Fig. 1), and enters one end or terminal of a heating coil E. This coil may consist of any desired number of units here shown as two E' and E², and the construction of which units may be identical with those described for the units of the coil C, and clearly shown in Fig. 2. Let it be supposed, therefore, that the aforesaid pipe b, which connects one terminal of the coil C, with a terminal of the heating coil E, also connects with the intermediate (12, Fig. 2) of the concentric tubes of the unit E', of the heating coil, and that the water passes through this tube and the end connection f, and the corresponding intermediate tube of the other unit E², of the heating coil until it leaves the heating coil and is conducted by a pipe g, to a suitable filter F.

In order to highly heat the water as it passes through the heating coil E, I connect with the end of the coil opposite to that where the water enters, a steam pipe G, supplied with live steam from any suitable source and say at 90 pounds (or over) pressure above vacuum. The steam pipe has one branch h, connecting at h', with the outer tube 10 (Fig. 2), of the coil unit E², and a second branch h², connecting with the inner (11) of the three concentric tubes of the coil unit, E². Steam therefore, passes through the inner and outer tubes of the coil unit E², in a direction opposite to the flow of the water through the intermediate (12) of the concentric tubes of said coil unit, thereby heating the inner and outer walls of the water-carrying intermediate tube and highly heating the water before it leaves the heating coil. The steam passes through the said inner and outer tubes of the coil unit E², and thence through the end connections, j and k, and the inner and outer tubes of the unit E', of the heating coil and finally enters the pipe H, in a more or less condensed form and may be conducted to the boiler. During its passage through the heating coil, the water has taken up the heat of the steam flowing in the opposite direction, the temperature of the water has been raised to say not less than 330° F. and the salts before held in solution in the water have become insoluble and remain so while the water is conducted through the pipe g, into the filter, which latter is designed to filter out or remove from the water the now suspended foreign particles, thus allowing the water to leave the filter in a purified state, through the pipe J.

The water retains much of its high temperature while in the filter and when it leaves the same, consequently the pipe J, will lead this hot water through branches into the inner and outer tubes of the end of the unit C², of the coil C, and at the opposite end of this coil at which the unfiltered cold water is admitted. The hot water circulates through the inner and outer tubes of the several units of the coil C, and as the cold water is passing through the intermediate of the tubes of these same coil units, the heat of the purified water is absorbed by the cold water flowing in the opposite direction with the result that the unfiltered water is pre-heated by the waste heat of the filtered water, and the filtered water is cooled and is sent through branches l—m, and the delivery pipe n, to the factory or other place of use. I may thus use steam for so highly heating the water to render its contained impurities insoluble and then filter out the impurities; and I utilize the heat contained in the thus filtered water to heat unfiltered cold water on its way to the heating coil, thereby so pre-heating the unfiltered water that less time and heat are required to raise its temperature to the point where the contained salts become insoluble and precipitatable. At the same time the cold water by removing the active heat units from the filtered water has so lowered the temperature thereof that the water is ready for use when it enters the pipe n.

Whatever salts are deposited in the heater will be in the final tube thereof and near the junction of the stream inlet and the water outlet; experience has shown that the deposit even at this point is slight and may be readily removed by percussive blows on the tube or by the use of a tube-cleaner of some suitable form, after first opening the head of that particular water tube and removing the tube. The reason why scale is not deposited in other parts of the heater is because of the smoothness of the tubes I use, these being preferably of seamless drawn brass, and the pressure and consequent rapidity of the flow of water through the tubes.

Having thus described my invention what I claim as new and desire to secure by Letters Patent is:

1. The process herein described of purifying water, said process consisting in heating the water under pressure to a temperature in excess of 300° F. so that its contained normally soluble matters become insoluble and precipitatable, and then while they are in their highly heated insoluble condition under pressure, removing said insoluble matter by filtration.

2. The process herein described of purifying water, said process consisting in heating the water under pressure to a temperature in excess of 300° F. so that its contained normally soluble matters become insoluble and precipitatable, and then while they are in their highly heated insoluble condition under pressure, removing said insoluble matter by filtration, and then pre-heating unfiltered water by the contained heat of the filtered water.

3. The process herein described of purifying water, said process consisting in heating the water under pressure to a temperature in excess of 300° F. so that its contained normally soluble matters become insoluble and precipitatable, and then while they are in their highly heated insoluble condition under pressure, removing said insoluble matter by filtration, and then flowing the heated filtered water and unfiltered cold water in opposite directions in passages cut off by a dividing wall, whereby the filtered water is cooled and the heat given up to the unfiltered water serves to pre-heat the same for subsequent super-heating.

In testimony whereof I affix my signature in presence of two witnesses.

JAMES W. MORRISON.

Witnesses:
T. W. FOWLER,
C. W. MOLER.